June 18, 1968   R. C. BRADLEY   3,388,932
JOINT FOR LAMINATED ARTICLES
Filed Feb. 7, 1964   2 Sheets-Sheet 1

INVENTOR
RICHARD C. BRADLEY

BY *Rommel, Alwine & Rommel*

ATTORNEYS

June 18, 1968   R. C. BRADLEY   3,388,932
JOINT FOR LAMINATED ARTICLES
Filed Feb. 7, 1964   2 Sheets-Sheet 2
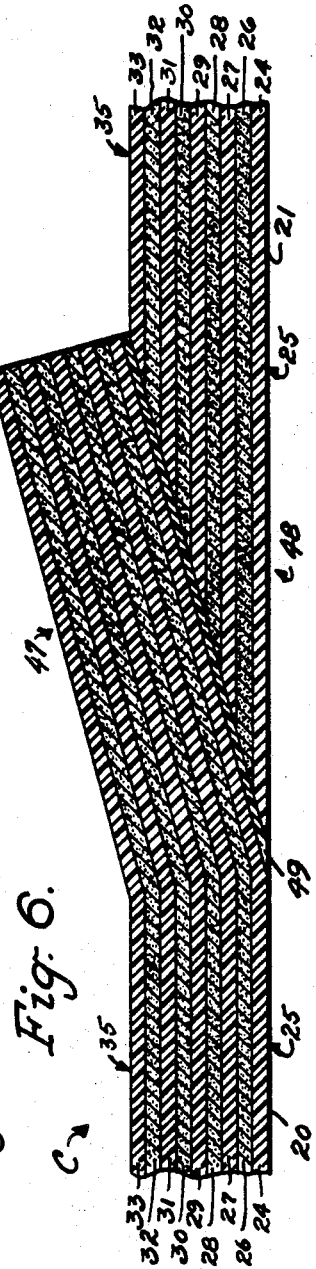
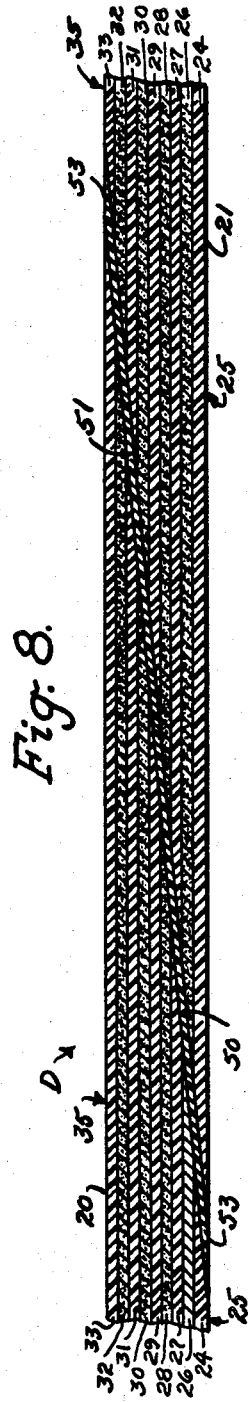
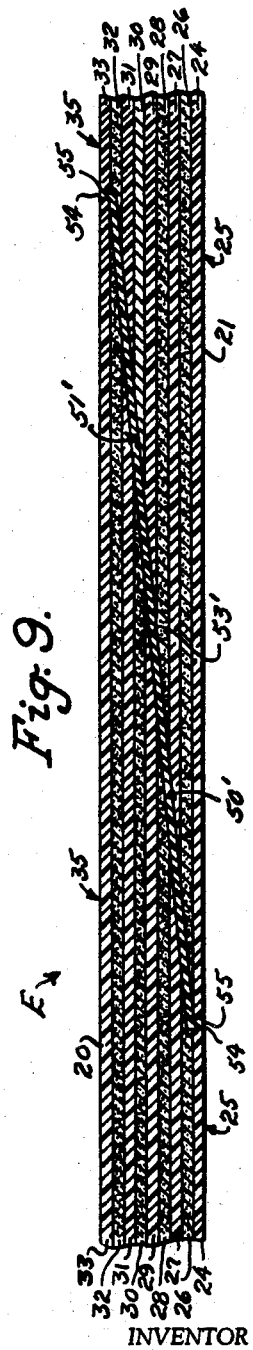
INVENTOR
RICHARD C. BRADLEY
BY *Rommel, Allaun and Rommel*
ATTORNEYS United States Patent Office 3,388,932
Patented June 18, 1968

3,388,932
JOINT FOR LAMINATED ARTICLES
Richard C. Bradley, % Plastic Engineering & Chemical Co., 3501 NW. 9th Ave., Fort Lauderdale, Fla. 33309
Filed Feb. 7, 1964, Ser. No. 343,400
3 Claims. (Cl. 285—288)

This invention relates generally to improvements in joints for laminated articles, and more particularly to improvements in joints for laminated plastic pipe.

In the joining together of laminated articles, and particularly in the joining together of laminated filament wound glass fiber-plastic resin pipes, such as those formed as illustrated in my copending application Ser. No. 331,549, filed Dec. 18, 1963, many problems have been encountered. For instance, the general procedure now followed for joining laminated articles is the same as that which was previously followed in connection with isotropic articles. In the case of laminated plastic pipes, this means the use of a bell and spigot joint, or other type of previously used joint, the pipes being joined together by an adhesive in a manner so that the total strength of the joint is dependent upon the strength of one of the laminate layers.

It is a primary object of this invention to provide a joint for laminated articles in which a plurality of the laminate layers of one article are bonded to a plurality of the laminate layers of another article, whereby the stress on such joint will be distributed over a plurality of the laminate layers of each article, rather than to be dependent upon the strength of only a single laminate layer of either article.

Other objects and advantages of the invention will be apparent during the course of the following detailed description, taken in connection with the accompanying drawings, forming a portion of this specification, and in which drawings:

FIG. 5 is a side view of a modified bell and spigot type pipe joint.

FIG. 6 is an enlarged sectional view taken substantially on the line 6—6 of FIG. 5.

FIG. 7 is a side view of one form of my improved pipe joint.

FIG. 8 is an enlarged sectional view taken substantially on the line 8—8 of FIG. 7.

FIG. 9 is an enlarged sectional view similar to FIG. 8, showing a modified form of my improved pipe joint.

Figure 1:
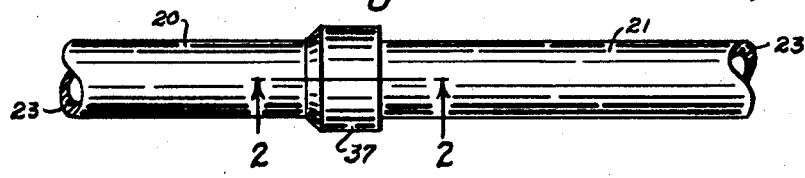
FIG. 1 is a side elevation of a bell and spigot type pipe joint.
Figure 2:
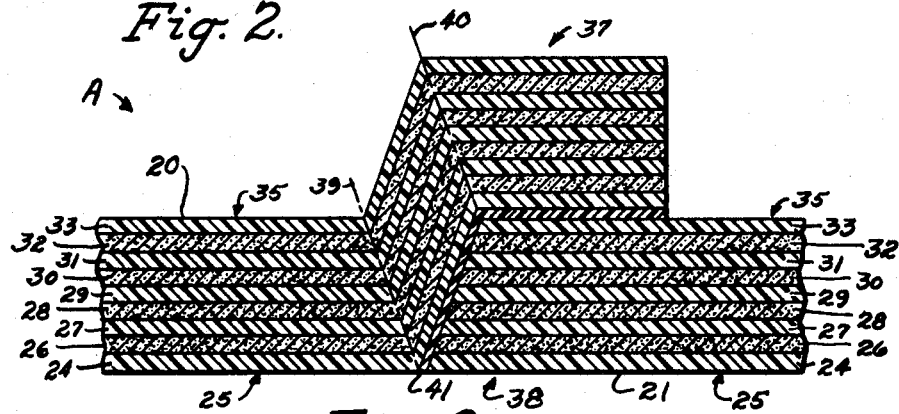
FIG. 2 is an enlarged sectional view taken substantially on the line 2—2 of FIG. 1.
Figure 3:
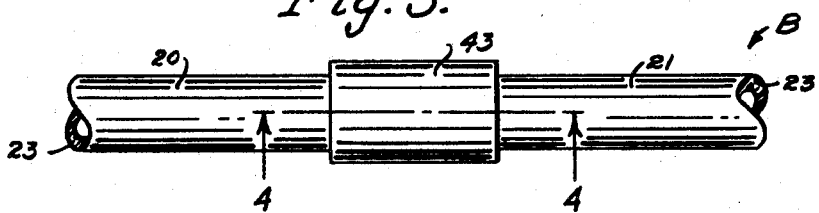
FIG. 3 is a side view of a sleeve type pipe joint.
Figure 4:
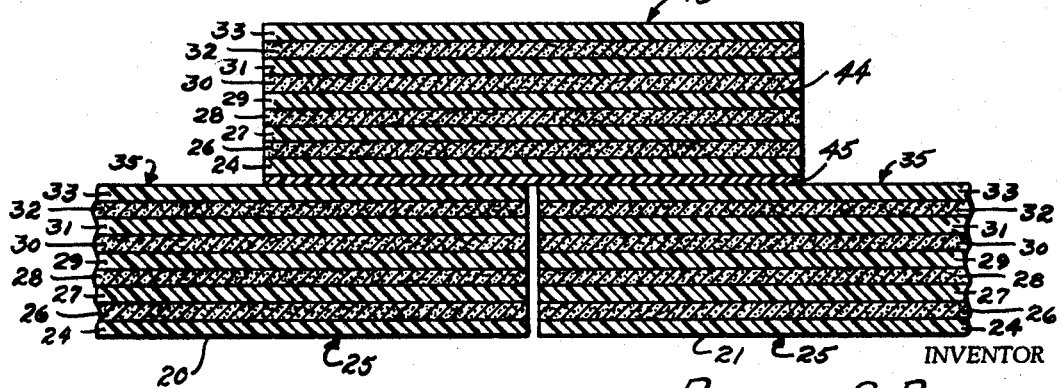
FIG. 4 is an enlarged sectional view taken substantially on the line 4—4 of FIG. 3.

In the drawings, wherein for the purpose of illustration are shown preferred and modified embodiments of the invention, and wherein similar reference characters designate corresponding parts throughout the several views, the letter A may generally designate the bell and spigot joint shown in FIGS. 1 and 2; B the sleeve joint shown in FIGS. 3 and 4; C the modified bell and spigot joint shown in FIGS. 5 and 6; D the improved joint as shown in FIGS. 7 and 8; and E the modified joint as shown in FIG. 9.

In describing the invention, I have found it convenient to specify certain numbers and types of laminates for each article which is to be joined. However, it is obvious that the invention is limited neither to a specific number of laminates, nor to the particular materials of which the laminates may be formed. Likewise, since the invention was primarily developed in connection with pipe joints, the description of the same will be specifically directed to pipe joints. However, it is obvious that my improved joint for laminated articles may be utilized for joining together laminated articles other than pipe.

Each of the forms A, B, C, D and E include the joining of a pipe 20 to a pipe 21, each pipe 20 and 21 having a body portion 23 including an inner laminate layer 24 of plastic resin which forms the interior surface 25 of the inner diameter of the pipe; a laminate layer 26 of filament wound glass fibers adjacent laminate layer 25; a laminate layer 27 of plastic resin adjacent laminate layer 26; a laminate layer 28 of filament wound glass fibers adjacent laminate layer 27; a laminate layer 29 of plastic resin adjacent laminate layer 28; a laminate layer 30 of filament wound glass fibers adjacent laminate layer 29; a laminate layer 31 of plastic resin adjacent laminate layer 30; a laminate layer 32 of filament wound glass fibers adjacent laminate layer 31; and a laminate layer 33 of plastic resin adjacent laminate layer 32, which laminate layer 33 forms the exterior surface 35 of the outer diameter of the pipe.

In form A, pipes 20 and 21 are illustrative of pipe lengths which are to be joined together, a bell 37 being shown on pipe 20 to form the female end thereof, and a spigot 38 being shown on pipe 21 to form the male butt end thereof which mates with bell 37 of pipe 20.

In the formation of body 23 into a bell 37, it will be noted that the laminate layers 24 and 26–33 thereof are angled between areas 39 and 40, the filament wound glass fibers being forced to follow a change of direction in plane between these areas 39 and 40. As a result, when a longitudinal stress is placed on such bell and spigot joint, the joint will "hinge" at the areas 39 and 40, crushing the plastic resin at these areas, which causes the joint to leak or "weep." This type of joint does not permit the filament wound glass fibers to absorb the longitudinal stress in uninterrupted tension.

The conventional mode of joining spigot 38 to bell 37 is by an adhesive 41 distributed along mating portions thereof. Adhesive 41 may be an epoxy resin or other suitable adhesive for cementing the pipe ends together.

In form B, pipes 20 and 21 are shown as being joined together by a sleeve 43 which may comprise a body portion 44 formed of laminated layers identical to those of pipes 20 and 21. Pipes 20 and 21 are shown as being joined to sleeve 43 by an adhesive 45 which may comprise an epoxy resin or other suitable adhesive for cementing pipe ends together.

In form B, it will be noted that the entire strength of the joint is dependent upon the plastic resin layers 33 of each pipe 20 and 21, and the plastic resin layer 24 of sleeve 43. Subjecting this joint to normal stress would cause failure of plastic resin layer 33 of pipe 20, layer 33 of pipe 21, and/or layer 24 of sleeve 43.

As a matter of fact, optimum design of laminated plastic pipe is so that each length thereof has a male end and a female end. A number of lengths of pipe may be thus consecutively mated in construction of a pipe line. Laminated plastic pipe would thus not usually have a joint as shown in form B, but it was deemed desirable to show the same in order to indicate the problems encountered in the use of sleeve type joints of this nature.

In form C, a modified bell 47 is provided on pipe 20, forming the female end thereof, and a modified spigot 48 is provided on pipe 21, forming the male butt end thereof which mates with bell 47 of pipe 20. Spigot 48 is joined to bell 47 by an adhesive 49 distributed along mating portions thereof. Adhesive 49 may be an epoxy resin or other suitable adhesive for cementing the pipe ends together.

The joint of form C is somewhat stronger than that of form A, however, the strength of the joint is still limited by the strength of plastic resin layer 24 of pipe 20. This resin layer 24 will, in normal use, be subjected to both shear stress and delamination stress which is likely to cause the joint to fail.

Referring generally to the laminated plastic pipes shown in forms A, B and C, the filament wound glass fibers thereof have a tensile strength of approximately 300,000 p.s.i., while the plastic resin layers thereof have a shear strength of approximately 3,000 p.s.i., and a tensile strength of approximately 8,000 p.s.i.

As previously specified, the joining of each pipe 20 to each pipe 21 includes, in the case of form A, cementing of the male butt end 38 to laminate layer 24 of plastic resin of bell 37 by adhesive 41; in the case of form B, the cementing of laminate layer 33 of plastic resin of each pipe 20 and 21 to laminate layer 24 of plastic resin of sleeve 43 by adhesive 45; and in the case of form C, the cementing of male butt end 48 to laminate layer 24 of resin of bell 47 by adhesive 49. Each of these types of joints forms a waterproof joint. However, if a longitudinal tensile stress were put on the pipes which are thus joined, such as would be the case when a hydrostatic pressure was applied to the pipes, the initial and the greatest stress would be at the adhesive lines 41, 45, and 49 thereof. If the adhesive line in such case held without failure, the next greatest shear stress would be placed, in the case of form A, on resin laminate layer 24 of bell 37; in the case of form B, on resin laminate layers 33 of pipes 20 and 21 and resin laminate layer 24 of sleeve 43; and, in the case of form C, on resin laminate layer 24 of bell 47.

If the filament wound layers of glass fibers and the plastic resin layer laminates were of identical strength, the laminated layers would be isotropic in structure, and therefore similar to steel pipe. However, as has been previously set forth, the filament wound glass fibers have approximately 100 times the strength of the plastic resin layers. Therefore, due to the unequal strengths of the components used to make the laminated pipe, it is obvious that once a shear or tensile strength is applied to laminated pipe which is joined in the manner as shown in forms A, B and C, that the layer of plastic resin which is relied upon for strength of the joint will be likely to fail and shear away from the adjacent layer of filament wound glass fibers, rather than to break the filament wound glass fibers, or to cause the filament wound glass fibers to support or assist the plastic resin at anywhere near the potential strength of the filament wound glass fibers.

An example of this form of stress would be to telescope a plurality of steel pipes into one another, adhesively joining the same together by an adhesive which is of a weaker alloy metal than steel, such as lead solder. Now, if a pulling force is exerted only on the smallest of the telescoped pipes, in one direction, while there is simultaneously exerted a pulling force in the opposite direction on the outermost of the telescoped pipes, the adhesive used to join the pipes together would fail due to shear.

In laminated plastic pipe comprising layers of filament wound glass fibers and plastic resin, the plastic resin component will naturally fail before the filament wound glass fiber component. When this happens, the layer of plastic resin crumbles or pulls apart into granular type sheared fragments. When this occurs, the continuous membrane watertight characteristics of the pipe are lost, and any fluid contained under pressure within a pipe of this laminated design will then migrate to the next laminate, which is a filament wound glass fiber. Even though the filament wound glass fibers are theoretically cemented to each other by the plastic resin in which they are embedded, in a waterproof relationship, there exists porosity at this laminate level due to the fact that, upon curing, all plastics shrink while the filament wound glass fibers remain dimensionally stable. This sets up a "shrink stress" in the plastic resin, causing minute fractures of the plastic resin. The "shrink stress" is further aggravated by thermal or mechanical shock, which will craze the "shrink stressed" resin. Also, it is virtually impossible to 100% saturate the filament wound glass fibers with plastic resins. Therefore, minute holes or voids or resin starved areas are likely to exist at intermittent areas where the filament wound glass fibers cross over one another. These conditions are likely to cause a filament wound glass fiber and plastic resin laminated pipe to "weep" or leak under fluid pressure. "Weep" is considered the foremost problem by manufacturers of filament wound glass fiber and plastic resin pipe today.

It becomes evident from the above that the optimum condition of pipe joint construction for this type of filament wound glass fiber and plastic resin pipe is that in which the filament wound glass fiber component is in pure tension when hydraulic pressure is applied. The filament wound glass fiber component must essentially absorb and be able to withstand all of the stress applied to the laminated pipe without shifting or stretching because if the filament wound glass fibers yield in any way, as little as 5%, then in this case, the plastic resin will be put into a tension or shear stress. When this happens, the plastic resin will fail and the pipe will then leak or "weep" under pressure.

In order to provide this optimum condition of joinder, I have developed joints as shown in forms D and E hereof. In these forms, each layer of filament wound glass fiber is caused to absorb its share of the stress applied at the joint. To provide this, I have so designed the joint to expose all layers of the filament wound glass fibers to the adhesive which is utilized to join the pipe ends together, with a maximum amount of surface area of each layer of filament wound glass fiber being exposed to the adhesive. This has generally been accomplished by using a very long, shallow, tapered, male and female type joint.

In form D of the invention, pipe 20 is provided with an elongated, shallow, tapered portion 50 which extends from the interior surface 25 thereof to the exterior surface 35 thereof, forming the female portion of the joint. It is to be noted that tapered portion 50 extends at an obtuse angle with respect to the interior surface 25 thereof and at an acute angle with respect to the exterior surface 35 thereof, and from interior surface 25 to exterior surface 35.

It is to be particularly noted that tapered portion 50 extends through each of the laminate layers of pipe 20, from laminate layer 33, exposing not only an end of each laminate layer but exposing considerable surface area of each laminate layer.

Pipe 21 is provided with an elongated, shallow, tapered portion 51 which extends from the interior surface 25 thereof to the exterior surface 35 thereof, forming the male portion of the joint. It is to be noted that tapered portion 51 extends at an acute angle with respect to the interior surface 25 thereof and at an obtuse angle with respect to the exterior surface 35 thereof, and from interior surface 25 to exterior surface 35.

Male tapered portion 51 is shaped to mate in a complementary relationship with female tapered portion 50, tapered portion 51 extending through each of the laminate layers of pipe 21, from laminate layer 24 to laminate layer 33, exposing not only an end of each laminate layer, but exposing considerable surface area of each laminate layer.

Tapered portion 50 of pipe 20 preferably extends at an obtuse angle greater than 80 degrees with respect to the interior surface 25 thereof and at an acute angle of less than 10 degrees with respect to the exterior surface 35 thereof, and tapered portion 51 of pipe 21 preferably extends at an acute angle less than 10 degrees with respect to the interior surface 25 thereof and at an obtuse angle greater than 80 degrees with respect to the exterior surface 35 thereof. This taper assures exposure of considerable surface area of each laminate layer of each pipe to joint. Optimum exposure is gained when tapered portion 50 of pipe 20 extends at an obtuse angle of 88.25 degrees with respect to the interior surface 25 thereof and at an acute angle of 1.75 degrees with respect to the exterior surface 35 thereof, and tapered portion 51 of pipe 21 extends at an acute angle of 1.75 degrees with respect to the interior surface 25 thereof and at an acute angle of 88.25 degrees with respect to the exterior surface 35 thereof.

An adhesive 53, which may be an epoxy resin or other suitable material, is distributed along tapered portions 50 and 51 in juxtaposition to cement the same together. It is to be noted that the laminate layers of plastic resin and the laminate layers of filament wound glass fibers of each pipe 20 and 21 are exposed to their respective tapered portions 50 and 51, so that the adhesive contacts a considerable surface area of each laminate area, thus cementing each laminate layer of one pipe to each laminate layer of the other pipe.

Inasmuch as epoxy resin, which is usually the adhesive used to join this type of laminated plastic pipe together, has a shear strength of only approximately 3,000 p.s.i., it may be questioned as to how it will be better able to withstand the longitudinal shear stress put on the cemented pipe joint when subjected to hydraulic pressure than would the plastic resin laminate layers of the pipes.

The answer is that each tapered portion 50 and 51 exposes a surface area to the adhesive including a tapered bisection of the filament wound glass fibers and plastic laminate of each tapered portion which are cemented together by the adhesive, the cementing together of such filament wound glass fibers serving to reinforce the joint in the provision of a bond which is sufficient to absorb this stress. As an example, on an 11 inch O.D. pipe having an elongated tapered portion of approximately 1¾ degrees with respect to the longitudinal axis thereof, and a 3/32 inch wall, wherein the tapered portion extends from the interior surface of the pipe to the exterior surface thereof, the approximate surface area of the tapered portion will be 3 inches (length of taper) times 33 inches (circumference of taper), or approximately 99 inches of surface area available to the epoxy adhesive resin. When this is multiplied by the shear resistance of the epoxy resin (3,000 p.s.i.), the result is 297,000. Therefore, 297,000 pounds is the force that will be needed to pull such a joint apart at the epoxy resin line. This is in excess of the amount of force that it would take to pull apart a 3/32 inch wall Fiberglas pipe having an 11 inch outside diameter, when formed in one piece. As the pipe wall thickness increases, so does the length of the taper in a constant relationship. Thus, the epoxy resin line is always stronger than the pipe itself with respect to longitudinal shear stress.

The question may then arise as to why the epoxy resin will not "weep" as previously described with respect to longitudinal stress applied to laminate layers of plastic resin of the pipe in forms A, B and C hereof. The difference in form D is that the epoxy resin line is tapered and thus is interconnected and cemented to each and every laminate layer of the filament wound glass fibers thereof and to each and every laminate layer of plastic resin thereof, providing an adhesive area in which the filament wound glass fibers therealong serve to reinforce the adhesive area and equalize the stress along the adhesive area.

It is preferable that a maximum strength type plastic resin, such as epoxy resin, be selected for the adhesive line, rather than the use of a more economical, lower strength, laminating resin, which would ordinarily be used to construct the pipe itself, since optimum strength is desired at the joint line, and since only a small quantity of adhesive resin is used in comparison to the quantity of laminating resin.

Form E of the invention is substantially similar to form D, except that tapered portion 50' of pipe 20 is abruptly terminated at 54 adjacent the exterior and interior surfaces thereof, the portions 54 extending and at an angle normal to the exterior and interior surface thereof; and tapered portion 51' of pipe 21 likewise abruptly terminates at 55 adjacent the exterior and interior surface thereof, the portions 55 extending at an angle normal to the interior and exterior surface thereof. In this form of the invention, the portions 54 and 55 are shown to illustrate that it is not absolutely necessary that the taper be continuous from the exterior surface of the pipe to the interior surface thereof, but that abutting shoulders on each pipe joint may be provided. An adhesive 53' is shown for cementing the pipe ends together.

The tapered portions of my improved joint may be formed as a part of the mold of the article, or the same may be provided by cutting or grinding a preformed article. Any suitable method of shaping may be employed which will expose a plurality of layers of laminate to the joint.

Various changes in the shape, size and arrangement of parts herein shown and described may be made without departing from the spirit of the invention or the scope of the following claims.

I claim:
1. In a joint for tubular members of the type formed of a plurality of laminate layers of plastic resin and fibrous reinforcing material, the combination of a first tubular member having a laminated wall portion formed of a plurality of layers of plastic resin and fibrous reinforcing material and provided with a male joint end having a first joint surface extending in a straight line taper along the line of from inner diameter to the outer periphery at an angle of less than two degrees with respect to the longitudinal axis thereof from adjacent the inner diameter in a direction toward the outer periphery thereof, said first joint surface exposing an end of a substantial number of the layers of plastic resin and an end of a substantial number of the fibers of the fibrous reinforcing material thereof, the outermost end of said first joint surface thereof extending in a line perpendicular to the longitudinal axis of said tubular member from the straight line taper thereof to the inner diameter thereof; a second tubular member having a laminated wall portion of substantially the same thickness as the wall portion of said first tubular member and formed of a plurality of layers of plastic resin and fibrous reinforcing material and provided with a female joint end having a second joint surface extending in a straight line taper along the line of from the outer periphery to the inner diameter at an angle of less than two degrees with respect to the longitudinal axis thereof from adjacent the inner diameter in a direction toward the outer periphery thereof, said second joint surface exposing an end of a substantial number of the layers of plastic resin and an end of a substantial number of the fibers of the fibrous reinforcing material thereof, the outermost end of said second joint surface thereof extending in a line perpendicular to the longitudinal axis of said tubular member from the straight line taper thereof to the outer periphery thereof and the taper of said second joint surface terminating near the inner diameter in a shoulder portion comprising a continuation of said second joint surface which extends from the taper of said second joint surface to the inner diameter at an angle normal to the longitudinal axis of the second tubular member; and an adhesive coating cementing said tapered male and female end portions together and bonding a plurality of the layers of plastic resin and fibrous reinforcing material exposed along said joint surface thereof of one of said tubular members to a plurality of the layers of plastic resin and fibrous reinforcing material exposed along said joint surface of the other of said tubular mem- bers, thereby forming a joint having a substantially constant diameter.

2. The method of joining one end of a first tubular member having a laminated wall portion formed of a plurality of layers of plastic resin and fibrous reinforcing material to a second tubular member having a laminated wall portion formed of a plurality of layers of plastic resin and fibrous reinforcing material, both tubular members having substantially the same wall thickness, which includes the steps of shaping the laminated wall portion of one end of the first tubular member to provide a male joint end by grinding the same in a straight line taper along the line of from inner diameter to the outer periphery at an angle of less than two degrees with respect to the longitudinal axis thereof from adjacent the inner diameter in a direction toward the outer periphery thereof to provide a male joint surface exposing an end of a substantial number of the layers of plastic resin and an end of the substantial number of the fibers of the fibrous reinforcing material thereof, the outermost end of the male joint surface being shaped to provide a joint surface extending in a line perpendicular to the longitudinal axis of the first tubular member from the straight line taper thereof to the inner diameter thereof; shaping the laminated wall portion of one end of the second tubular member to provide a female joint end by grinding the same in a straight line taper along the line of from the outer periphery to the inner diameter at an angle of less than two degrees with respect to the longitudinal axis thereof from adjacent the inner diameter in a direction toward the outer periphery thereof to provide a female joint surface exposing an end of a substantial number of the layers of plastic resin and an end of a substantial number of the fibers of fibrous reinforcing material thereof, the outermost end of the female joint surface being shaped to provide a joint surface extending in a line perpendicular with respect to the longitudinal axis of the second tubular member from the straight line taper thereof to the outer periphery thereof and the other end of the female joint surface being shaped to terminate near the inner diameter of the second tubular member in a shoulder portion which provides a continuation of the female joint surface extending from the tapered female joint surface to the inner diameter at an angle normal to the longitudinal axis of the second tubular member; and joining the joint surface of the laminated wall portion of the first tubular member to the joint surface of the laminated wall portion of the second tubular member with an adhesive which is disposed in a manner to contact substantially all of the joint surface of the laminated wall portion of each tubular member in juxtaposition to bond a plurality of the ends of layers of plastic resin and a plurality of the ends of the fibers of the fibrous reinforcing material exposed in the joint surface of the laminated wall portion of one tubular member to a plurality of the ends of layers of plastic resin and a plurality of the ends of the fibers of the fibrous reinforcing material exposed in the joint surface of the laminated wall portion of the other tubular member, thereby forming a joint having a substantially constant diameter.

3. The method of joining one end of a first tubular member having a laminated wall portion formed of a plurality of layers of plastic resin to a second tubular member having a laminated wall portion formed of a plurality of layers of plastic resin, both tubular members having substantially the same wall thickness, which includes the steps of shaping the laminated wall portion of one end of the first tubular member to provide a male joint end by grinding the same in a straight line taper along the line of from inner diameter to the outer periphery at an angle of less than two degrees with respect to the longitudinal axis thereof from adjacent the inner diameter in a direction toward the outer periphery thereof to provide a male joint surface exposing an end of a substantial number of the layers of plastic resin thereof, the outermost end of the male joint surface being shaped to provide a joint surface extending in a line perpendicular to the longitudinal axis of the first tubular member from the straight line taper thereof to the inner diameter thereof; shaping the laminated wall portion of one end of the second tubular member to provide a female joint end by grinding the same in a straight line taper along the line of from the outer periphery to the inner diameter at an angle of less than two degrees with respect to the longitudinal axis thereof from adjacent the inner diameter in a direction toward the outer periphery thereof to provide a female joint surface exposing an end of a substantial number of the layers of plastic resin thereof, the outermost end of the female joint surface being shaped to provide a joint surface extending in a line perpendicular with respect to the longitudinal axis of the second tubular member from the straight line taper thereof to the periphery thereof and the other end of the female joint surface being shaped to terminate near the inner diameter of the second tubular member in a shoulder portion which provides a continuation of the female joint surface extending from the tapered female joint surface to the inner diameter at an angle normal to the longitudinal axis of the second tubular member; and joining the joint surface of the laminated wall portion of the first tubular member to the joint surface of the laminated wall portion of the second tubular member with an adhesive which is disposed in a manner to contact substantially all of the joint surface of the laminated wall portion of each tubular member in juxtaposition to bond a plurality of the ends of layers of plastic resin exposed in the joint surface of the laminated wall portion of one tubular member to a plurality of the ends of layers of plastic resin exposed in the joint surface of the laminated wall portion of the other tubular member, thereby forming a joint having a substantially constant diameter.

References Cited

UNITED STATES PATENTS

| 143,922 | 10/1873 | Muller | 285—423 X |
| 1,207,853 | 12/1916 | Burrell | 156—157 |
| 2,142,150 | 1/1939 | Replogle | 285—423 X |
| 2,943,009 | 6/1960 | Mirsky et al. | |
| 2,977,269 | 3/1961 | Nerwick. | |
| 3,032,870 | 5/1962 | Rohrberg et al. | 285—332 X |
| 3,156,489 | 11/1964 | Deringer. | |
| 1,998,633 | 3/1935 | Nichols | 285—260 |
| 2,653,887 | 9/1953 | Slayter | 156—191 |
| 2,795,440 | 6/1957 | Holycross et al. | 285—423 |

FOREIGN PATENTS

| 1,123,506 | 6/1956 | France. |
| 1,115,440 | 10/1961 | Germany. |
| 567,973 | 3/1945 | Great Britain. |
| 356,507 | 10/1961 | Switzerland. |

EDWARD C. ALLEN, *Primary Examiner.*

DAVE W. AROLA, *Assistant Examiner.*